July 5, 1927.
M. Q. CORBETT
1,634,982
HANGAR FLOOR VALVE
Filed April 11, 1923
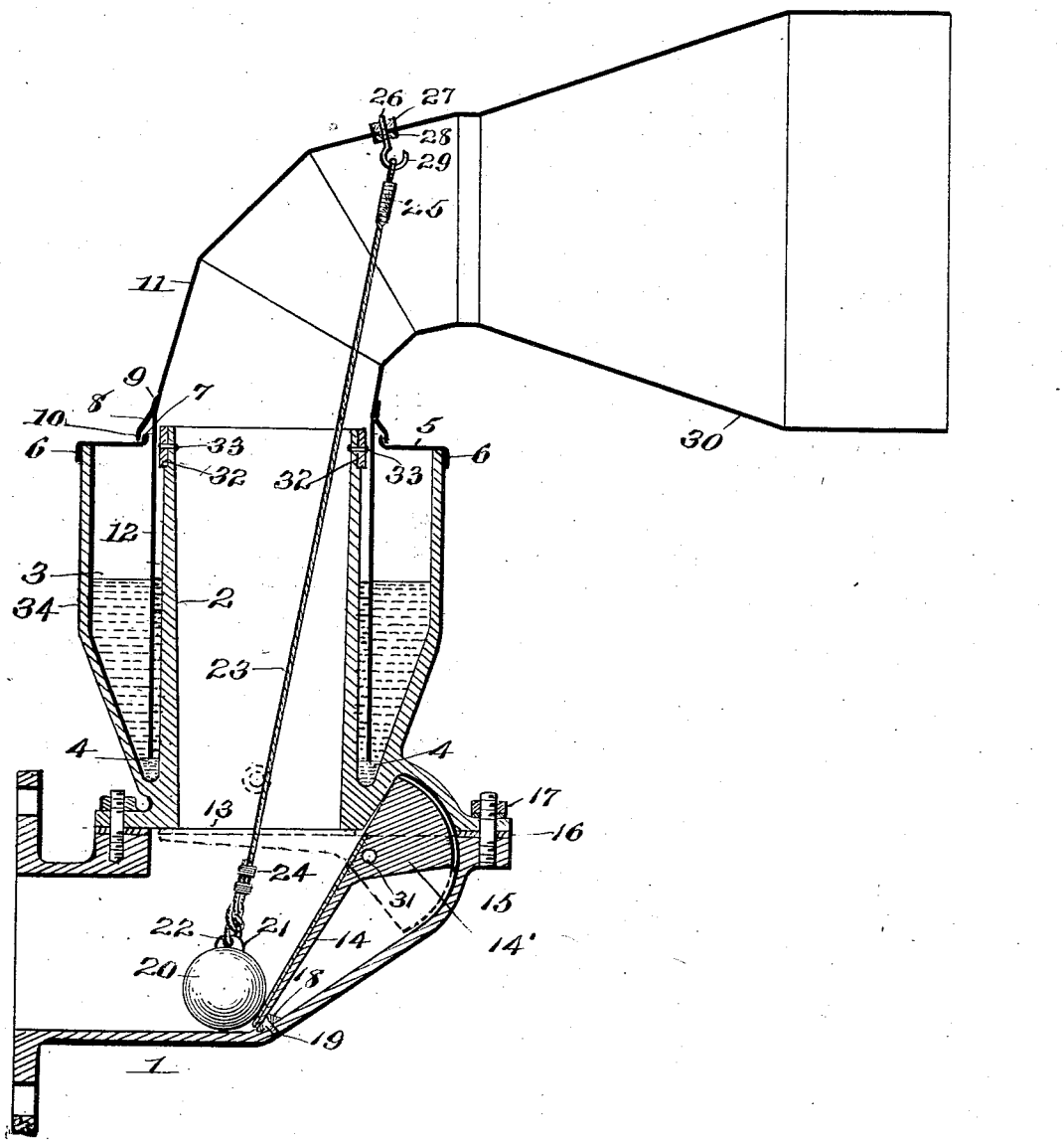
Inventor
Matt Q. Corbett
By Robert H. Young
Atty Patented July 5, 1927.

1,634,982

UNITED STATES PATENT OFFICE.

MATT Q. CORBETT, OF CARNEGIE, PENNSYLVANIA.

HANGAR FLOOR VALVE.

Application filed April 11, 1923. Serial No. 631,331.

The object of this invention is to provide a suitable valve construction and operating means adaptable particularly for use as a hangar floor valve in connection with inflation conduits for filling gas balloons.

In the conventional type of such construction, the hydrogen line from the gas plant terminates in a standard gate or globe valve with an elbow having an end of an inflation tube connected thereto. The usual type valve used in this connection is a non-rising stem gate valve, not easily purged and not gas tight. This causes respectively a loss in time, due to slow actuation of the valve possibility of impure gases, and loss of gas through leakage.

It is therefore proposed to provide a suitable type of quick acting connection at the point of connection of the terminal of the gas line and the elbow of an inflation tube so designed as to permit complete purging of the connection and at the same time eliminate leakage of gas, such connections preferably being flush with the floor when used in inflating a balloon in a hangar.

With the foregoing and other objects in view, the invention resides in the combination of parts and in the details of construction hereinafter described and claimed, it being understood that changes within the scope of the appended claims may be made in the precise embodiment illustrated in the accompanying drawings in which—

The figure is a vertical section taken through the terminal of the gas line, the valve, and valve actuating means, and the water seal, elbow, and inflation tube.

Referring more particularly to the drawings the valve casing 1 is connected to a casting 2 by means of bolts 15 and nuts 17 the joint being provided with washers 16. The casting 2 is provided with bowl shaped outer casing 34 integral therewith and closed at the bottom, with an upwardly flaring construction. A shallow deposit of soft metal 4, such as lead is placed at the bottom of the thus constructed container 3.

The lower vertically extending section 12 of the elbow 11 is, when lowered into the container 3, adapted to rest on the lead base 4. A top plate 5, centrally apertured, is placed on the outer casing 34 and retained thereon by a down-turned flange 6 of the plate 5 being connected thereto. Plate 5 also has an upturned flange 7.

A circular flange 9 having an angular portion 8 and downturned portion 10 to rest on the plate 5 outwardly of the flange 7 is connected to the section 12. When the container 3 is filled or partially filled with liquid and the bottom of the section 12 is resting on the base 4, a fluid sealed gas-tight joint is effected as will be clearly seen by the foregoing description. The casting 2 is further provided with an exterior collar 32 attached thereto by means of rivets 33.

On a bearing member 31 suitably supported by the casing 1, there is pivoted a check valve 14 being counterbalanced by means of a weight 14' integral therewith. A valve seat 13 is provided for valve 14 when closed, while a valve seat 18 mounted on the casing 1 by means of a bolt 19 is provided for the valve when in open position.

A ball weight 20 is arranged to operate against the counterbalance 14' to open the valve 14 when desired. The ball 20 is provided with a projection 21 with an aperture 22 to receive a cable 23 doubled back with two half-hitches and tied at 24. In an upper section of the elbow 11 a bolt 26 is connected and retained by bolts 27 and 28. Cable 23 also passes through a hook 29 of the bolt 26 and is doubled back and fastened at 25. Thus the ball 20 is suspended from the elbow 11 by means of the cable 23 so that when the extension 12 is on the base 4, the ball by reason of its weight presses the valve 14 open and against the seat 18 in the valve position indicated in full lines.

The operation of the device is based primarily on the simple bell trap and water seal idea. The new feature is the installation of the clap or check valve 14 in order to cut off the free flow of gas when the connection is open. The drawing shows the elbow in place and the clap valve 14 held open by the ball weight 20, thus permitting a free flow of gas through the enlarged section 30 to the balloon. To close the valve 14, the elbow is lifted off of the water seal in container 3, thus lifting the weight 20, off of the clap valve 14 and permitting it to close as it seats against the valve-seat 13. To insure gas tightness after the removal of the inflation tube, a suitable cap is placed over the part 2 and makes a gas tight fit with the exterior collar 32.

Thus there is provided a device of the class described in which connection and disconnection between the balloon and gas source may be easily made; the valve is absolutely gas tight; an attendant cannot have the valve partly open and allow the gas to escape when not desired; instantaneous disconnection may be made as a safety measure in case of fire; attachment to gas line may be made and mounted below the floor, thus leaving the hangar floor clear of obstruction.

This device has received actual test and found satisfactory, the test consisting in forcing gas through it from one supply balloon to another under various pressures. At the beginning of the test the gas was forced through it by simply hanging sand bags on the supply balloon. At the conclusion of the test the pressure was increased to about one inch.

To determine whether a spark sufficient to ignite the gas might be caused by friction in removing the elbow or replacing the cap, the non-return valve was held open allowing gas to flow through the opening at the top and the elbow and cap placed in position and removed a number of times, moving them rapidly up and down each time before pulling them off, and striking against the mouth of the valve in an effort to cause a spark, the result being the non-occurrence of any spark which would cause a fire and resultant damage.

What I claim is—

1. In combination, a lower and upper casing and a valve therebetween, said upper casing being provided with a water seal, a cap mounted on said water seal, an elbow adapted to engage said upper casing and said water seal and having a flange to engage said cap on said upper casing, said valve being normally closed when said elbow is disconnected from said upper casing.

2. In combination, a lower and upper casing and a valve therebetween, said upper casing being provided with a water seal, a cap mounted on said water seal, an elbow adapted to engage said upper casing and said water seal and having a flange to engage said cap on said upper casing, said valve being normally closed when said elbow is disconnected from said upper casing, means simultaneous with and solely dependent upon the attachment of said elbow to said upper casing, for opening said valve.

3. In combination, a lower and upper casing and a valve therebetween, said upper casing being provided with a water seal, a cap for said water seal, an elbow adapted to engage said upper casing and said water seal and having a flange to engage said cap on said upper casing, said valve being normally closed when said elbow is disconnected from said upper casing, means simultaneous with and solely dependent upon the attachment of said elbow to said upper casing for opening said valve, said means comprising a ball weight suspended by a cable from said elbow and adapted by means of its weight to open said valve and retain it in said open position while said elbow is in the assembly.

4. In combination, a lower and upper casing and a valve therebetween, said upper casing being provided with a water seal, a cap for said water seal, an elbow adapted to engage said upper casing and said water seal and having a flange to engage said cap on said upper casing, said valve being normally closed when said elbow is disconnected from said upper casing, means simultaneous with and solely dependent upon the attachment of said elbow to said upper casing for opening said valve, said means comprising a ball weight suspended by a cable from said elbow and adapted by means of its weight to open said valve and retain it in said opening position while said elbow is in the assembly, said valve being downwardly opening, upwardly closing, eccentrically pivoted and counterbalanced to retain said valve normally in closed position.

5. In combination, a lower and upper casing and a valve therebetween, said upper casing being provided with a water seal, a cap for said water seal, an elbow adapted to engage said upper casing and said water seal and having a flange to engage said cap on said upper casing, said valve being normally closed when said elbow is disconnected from said upper casing, means simultaneous with and solely dependent upon the attachment of said elbow to said upper casing for opening said valve, said means comprising a ball weight suspended by a cable from said elbow and adapted by means of its weight to open said valve, said valve being downwardly opening, upwardly closing, eccentrically pivoted and counterbalanced to retain said valve normally in closed position, said water seal comprising an outer casing exterior of and integral with said upper casing and adapted to receive water to form a water seal, said outer casing having a lead deposit to form a soft metal seat for the lower end of said elbow.

6. In combination, a lower and upper casing and a valve therebetween, said upper casing being provided with a water seal, a cap for said water seal, an elbow adapted to engage said upper casing and said water seal and having a flange to engage said cap on said upper casing, said water seal comprising an outer casing exterior of and integral with said upper casing and adapted to receive water to form a water seal, said outer casing having a lead deposit to form a soft metal seat for the lower end of said elbow.

7. In combination, a lower and upper casing having a valve therebetween, said upper casing having central cylindrical portion and an outwardly extending flange portion adapted to provide an annular recess between said central portion and said flange portion to provide a water seal, a cap mounted on the outer portion of said water seal and extending to a point closely adjacent said cylindrical portion, an elbow adapted to engage said upper casing immediately adjacent said cylindrical portion, and a flange on said elbow adapted to project over the inner edge of said cap, said valve being normally closed when the elbow is disconnected from the upper casing.

In testimony whereof I affix my signature.

MATT Q. CORBETT.